United States Patent
Rohwer et al.

(10) Patent No.: US 8,973,363 B2
(45) Date of Patent: Mar. 10, 2015

(54) ELECTRICAL MACHINE COMPRISING COOLING CHANNELS

(75) Inventors: Thorsten Rohwer, Tamm (DE); Denis Kern, Stuttgart (DE); Andreas Herzberger, Remseck-Aldingen (DE)

(73) Assignee: Robert Bosch GmbH, Stuttgart (DE)

(*) Notice: Subject to any disclaimer, the term of this patent is extended or adjusted under 35 U.S.C. 154(b) by 835 days.

(21) Appl. No.: 13/255,043

(22) PCT Filed: Mar. 2, 2010

(86) PCT No.: PCT/EP2010/052614
§ 371 (c)(1),
(2), (4) Date: Sep. 10, 2013

(87) PCT Pub. No.: WO2010/100143
PCT Pub. Date: Sep. 10, 2010

(65) Prior Publication Data
US 2014/0069099 A1  Mar. 13, 2014

(30) Foreign Application Priority Data
Mar. 6, 2009  (DE) .......................... 10 2009 001 387

(51) Int. Cl.
*F02D 25/00* (2006.01)
*H02K 9/00* (2006.01)
(Continued)

(52) U.S. Cl.
CPC ................ *H02K 9/005* (2013.01); *H02K 5/20* (2013.01); *H02K 9/19* (2013.01); *B60L 3/0061* (2013.01); *B60L 11/14* (2013.01); *Y10S 903/902* (2013.01); *B60L 2210/40* (2013.01); *B60L 2240/36* (2013.01); *B60L 2240/425* (2013.01)

USPC .................. 60/714; 310/54; 310/64; 903/902

(58) Field of Classification Search
CPC ........................................................ H02K 5/20
USPC .................... 60/320, 714; 310/54, 58, 59, 64; 165/80.4, 169
See application file for complete search history.

(56) References Cited

U.S. PATENT DOCUMENTS 2,611,798 A  9/1952 Hayes
2,862,120 A  11/1958 Onsrud
(Continued)

FOREIGN PATENT DOCUMENTS

DE  19624519  1/1998
DE  19928247  12/1999
(Continued)

OTHER PUBLICATIONS

PCT/EP2010/052614 International Search Report dated Aug. 2, 2010.

*Primary Examiner* — Thomas Denion
*Assistant Examiner* — Mickey France
(74) *Attorney, Agent, or Firm* — Michael Best & Friedrich LLP

(57) ABSTRACT

The invention relates to an electric motor, in particular for a motor vehicle, comprising a housing (9), a shaft (8) having an axle (30), a stator and a rotor, at least one channel (11) for conducting a coolant for cooling the electric motor (5), wherein the geometry of the alignment of at least one section (12) of the at least one channel (11) is designed such that the coolant flows in the direction of the axle (30) of the shaft (8) through the at least one channel (11), having a deviation of less than 40°.

11 Claims, 5 Drawing Sheets

(51) Int. Cl.
  *H02K 5/20* (2006.01)
  *H02K 9/19* (2006.01)
  *B60L 3/00* (2006.01)
  *B60L 11/14* (2006.01)

(56) References Cited

U.S. PATENT DOCUMENTS

| | | | |
|---|---|---|---|
| 4,864,172 A | | 9/1989 | Dodt |
| 5,091,666 A | * | 2/1992 | Jarczynski ............... 310/54 |
| 5,859,482 A | | 1/1999 | Crowell et al. |
| 2003/0222519 A1 | * | 12/2003 | Bostwick ............... 310/58 |
| 2004/0066100 A1 | * | 4/2004 | Vlemmings et al. ............ 310/59 |
| 2005/0206252 A1 | | 9/2005 | Klaus et al. |
| 2006/0043801 A1 | * | 3/2006 | Adra ............... 310/54 |
| 2008/0030085 A1 | * | 2/2008 | Gizaw et al. ............... 310/54 |
| 2008/0185924 A1 | * | 8/2008 | Masoudipour et al. ......... 310/54 |

FOREIGN PATENT DOCUMENTS

| | | |
|---|---|---|
| DE | 102006000732 | 7/2007 |
| JP | 51018902 | 12/1976 |
| JP | 7336946 | 12/1995 |
| JP | 8149757 | 6/1996 |
| WO | WO 2009053496 A2 * | 4/2009 |

* cited by examiner

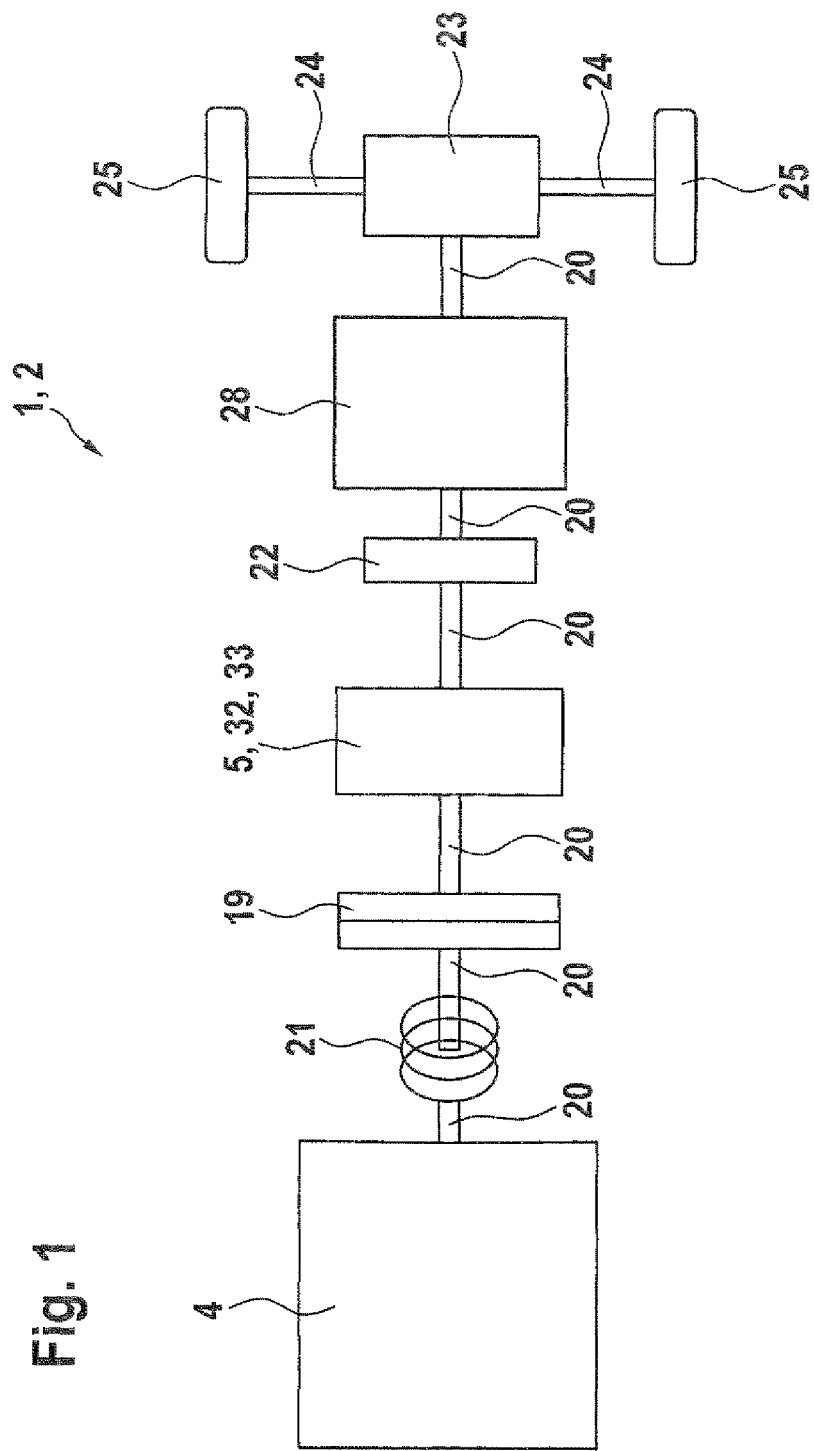

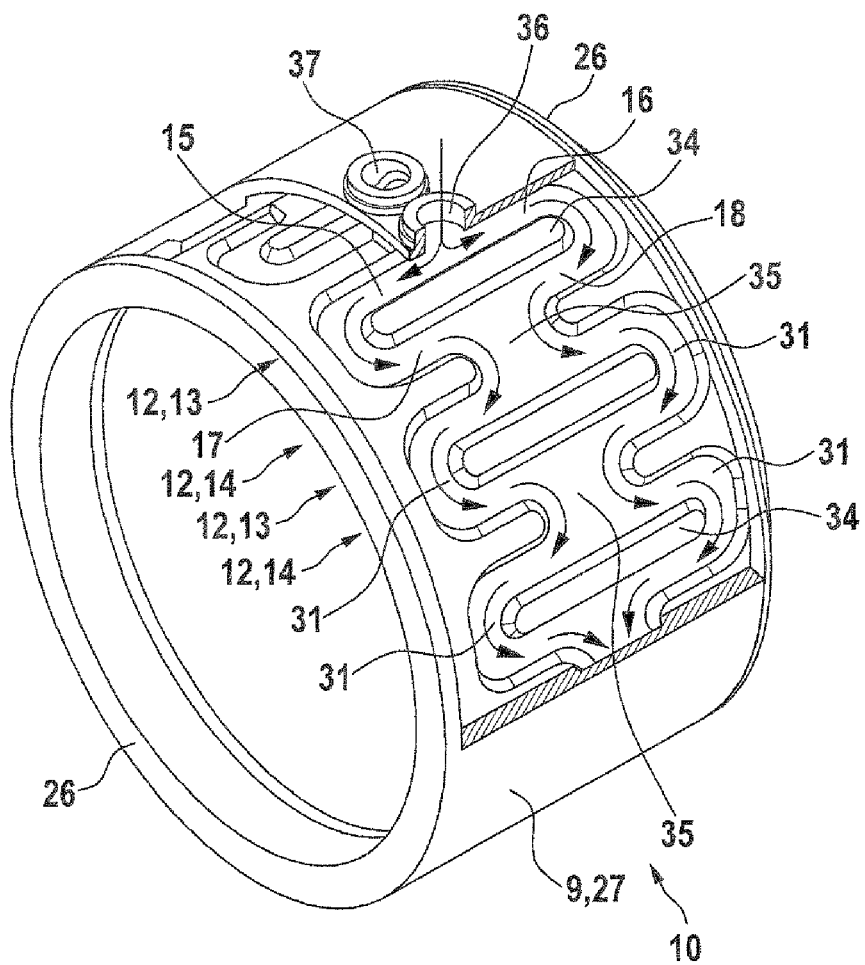

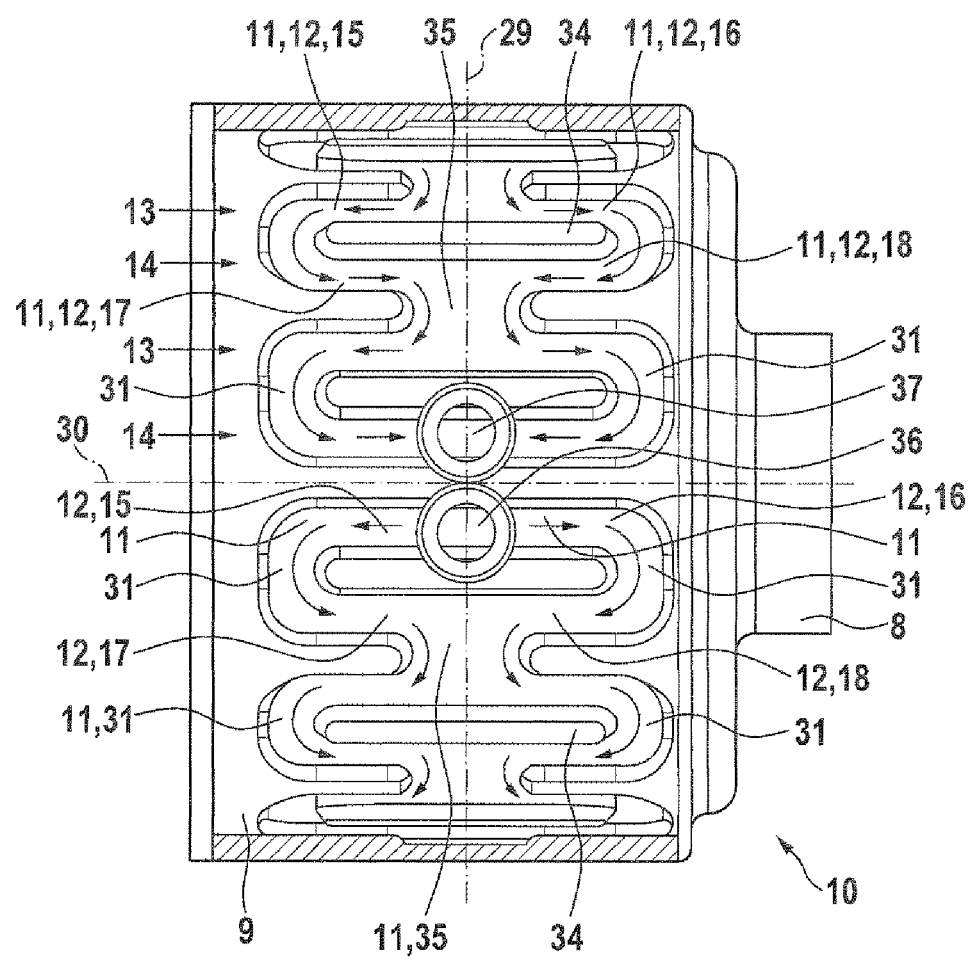

ELECTRICAL MACHINE COMPRISING COOLING CHANNELS

BACKGROUND OF THE INVENTION

The present invention relates to an electrical machine and to a drive device.

Drive devices, preferably hybrid drive devices, in particular comprising an internal combustion engine and an electrical machine, are used, for example, in order to drive motor vehicles. The electrical machine in the motor vehicle, which electrical machine operates as a motor and a generator, has an axle or shaft on which the stator or rotor is arranged.

Waste heat is produced in the electrical machine, in particular in the stator and/or rotor, and therefore it is necessary to cool the electrical machine. The stator and rotor are arranged within a housing of the electrical machine. A spiral or helical channel for conducting a cooling fluid for cooling the electrical machine is incorporated in the housing. The axle around which the spiral cooling channel is wound corresponds to the axis of the shaft of the electrical machine in this case. After the cooling fluid is introduced into the channel, the cooling fluid absorbs heat and thus is at a higher temperature. This leads to non-uniform temperature distribution over the axial length of the electrical machine. Therefore, the absorption of heat by the cooling fluid is disadvantageously reduced.

DE 199 28 247 B4 describes a motor having a motor housing, a stator of cylindrical shape which is mounted on the motor housing, an internal rotor which is arranged in a rotatable manner within the stator, an external rotor which is arranged in a rotatable manner about the stator, with the internal rotor, the stator and the external rotor being arranged in a concentric manner and having a plurality of pins for mounting the stator on the motor housing, with a cooling system being provided which has a plurality of pairs of cooling channels which are formed in the stator, a coolant inlet opening for introducing coolant into the cooling channels, a coolant outlet opening for diverting coolant from the cooling channels, with the coolant inlet opening and the coolant outlet opening being provided at an axial end of the internal rotor and being connected to the cooling channels, a coolant return section for connecting each pair of cooling channels, with the coolant return section being provided at another axial end of the internal rotor, and with the cooling channels being formed from the stator and the plurality of pins.

SUMMARY OF THE INVENTION

An electrical machine, in particular for a motor vehicle, comprising a housing, a shaft having an axis, a stator and a rotor, at least one channel for conducting a cooling fluid for cooling the electrical machine, with the geometry or the orientation of at least one section of the at least one channel being designed to the effect that the cooling fluid flows through the at least one channel with a deviation of less than 40°, in particular exclusively, in the direction of the axis of the shaft.

The axial flow of cooling fluid in the at least one channel produces a substantially constant temperature distribution in the axial direction of the electrical machine. As a result, the heat absorption by the cooling fluid can be improved, in particular on account of the greatest quantity of heat being given off by the stator and/or the rotor in the region of the central plane of the electrical machine.

In particular, the geometry or the orientation of the at least one channel is designed to the effect that, in at least a first pair of two sections of the at least one channel, the cooling fluid in an A section flows in the opposite direction to a B section. When the cooling fluid flows in the opposite and axial direction with a deviation of less than 40 degrees in the A section and in the B section, the heat can be particularly effectively absorbed and uniformly distributed by the cooling fluid because distribution takes place in the axial direction on account of the opposite direction.

In a further refinement, a component stream of cooling fluid can in each case be conducted though the A section and through the B section of the at least one channel. Splitting the cooling fluid into two component streams which are each conducted through the A section and the B section has the advantage that, after the two component streams are combined, it is possible to thoroughly mix these separated streams.

In a supplementary embodiment, the two component streams are substantially identical, for example with a deviation of less than 30%.

The geometry or the orientation of the at least one channel is designed to the effect that the cooling fluid in the A section and in the B section flows to an axial end face of the electrical machine or of a component of the electrical machine. The cooling fluid flowing in the A section and the B section is therefore conducted from a central plane of the electrical machine in each case to the two axial end faces of the electrical machine. The greatest amount of waste heat is released in the region of the central plane, that is to say in the center of the electrical machine, and therefore said waste heat is conducted to the axial end faces and there heat can be given off by the cooling fluid to the surrounding area.

In one variant, the geometry or the orientation of the at least one channel is designed to the effect that, in at least a second pair of two sections of the at least one channel, the cooling fluid in a C section flows in the opposite direction to a D section.

Expediently, a component stream of cooling fluid can in each case be conducted through the C section and through the D section of the at least one channel.

In a further embodiment, the two component streams are substantially identical, for example with a deviation of less than 30%.

In particular, the geometry or the orientation of the at least one channel is designed to the effect that the cooling fluid in the C section and in the D section flows to a central plane of the electrical machine or of a component of the electrical machine, said central plane being perpendicular to an axis of the shaft. The central plane is expediently at the same distance from both axial end faces of the electrical machine or a component of the electrical machine.

In a further refinement, the cooling fluid can be conducted though two curve sections of the at least one channel from the at least one first pair comprising the A section and the B section to the at least one second pair comprising the C section and the D section, and/or vice versa. In the two curve sections, the cooling fluid is conducted from the first pair to the second pair, and vice versa. In the two curve sections, the cooling fluid flows at least partially in the radial direction, and therefore the cooling fluid can also be conducted through the housing and/or the stator in the radial direction as a result.

In a supplementary variant, the at least one first pair comprising the A section and the B section and the at least one second pair comprising the C section and the D section are fluidically separated from one another by means of a separating crosspiece. The separating crosspiece permits structurally simple fluidic separation of the first pair comprising the A section and the B section from the second pair comprising the C section and the D section.

In a further variant, the cooling fluid can be conducted through the electrical machine in the radial direction, for example by it being possible to conduct the cooling fluid through at least two curve sections of the at least one channel and/or through at least one connecting section of the at least one channel.

In a further refinement, the cooling fluid can be conducted through at least one connecting section of the at least one channel from the at least one first pair comprising the A section and the B section to the at least one second pair comprising the C section and the D section, and/or the cooling fluid can be conducted through at least one connecting section of the at least one channel from the at least one second pair comprising the C section and the D section to the at least one first pair comprising the A section and the B section.

The cooling fluid flows at least partially in the radial direction in the at least one connecting section, and therefore the cooling fluid can also be conducted through the electrical machine in the radial direction as a result. Furthermore, the component streams of the cooling fluid, which component streams are conducted through the C section and the D section, are combined in the at least one connecting section, and therefore possible temperature differences in the region between the C section and the D section can be substantially compensated for by through mixing in the at least one connecting section. In addition, the at least one connecting section is preferably arranged in the region of a central plane of the electrical machine, the greatest quantity of heat being released in the region of said connecting section. The connection section, in particular the flow cross section of the connecting section, is, in this case, preferably designed to the effect that the cooling fluid is conducted through the connection section in a turbulent stream. This results firstly in good admixing of the cooling fluid and secondly heat can be absorbed particularly effectively in the case of a turbulent stream, this having the advantage that a particularly effective cooling action of the cooling fluid is also possible in the at least one connecting section on account of the turbulent stream in the region of the electrical machine with the greatest need for cooling because the greatest quantity of heat is produced in said region.

In particular, the at least one channel is formed in the housing and/or in the stator, and/or the cooling fluid is a liquid, in particular an oil or a water/glycol mixture, and/or the cooling fluid can be conducted through the at least one channel in the radial and axial direction of the electrical machine, and can preferably be conducted in a meandering manner, in particular with opposing axial flow.

A drive device according to the invention, preferably a hybrid drive device, in particular for a motor vehicle, comprises preferably an internal combustion engine, in particular for driving the motor vehicle, preferably at least one housing, at least one electrical machine, which is preferably arranged in the at least one housing and has a stator and a rotor, with the at least one electrical machine being designed in accordance with an electrical machine as described in this property right application.

In a further refinement, the at least one housing has two or more parts.

In an additional refinement, the housing has one part.

In a further refinement, the at least one electrical machine operates as a motor and/or as a generator.

A motor vehicle according to the invention comprises an electrical machine which describes this property right application and/or a drive device as described in this property right application.

In a further refinement, the motor vehicle comprises rechargeable batteries. The batteries supply electrical power to the electrical machine and, when the motor vehicle is decelerated by means of the electrical machine, the batteries can be charged by the electrical power generated by the electrical machine. In addition, the batteries can also be charged when the vehicle is stationary, for example by a public power supply system. In particular, the batteries are in the form of lithium ion batteries.

BRIEF DESCRIPTION OF THE DRAWINGS

One exemplary embodiment of the invention will be described in greater detail below with reference to the attached drawings, in which:

FIG. 1 shows a highly schematic illustration of a hybrid drive device,

FIG. 4 shows a perspective view of the housing of the electrical machine according to FIG. 1 comprising a channel for conducting a cooling fluid, FIG. 5 shows a plan view of the housing of the electrical machine according to FIG. 1 comprising the channel for conducting the cooling fluid.

DETAILED DESCRIPTION

Figure 3:
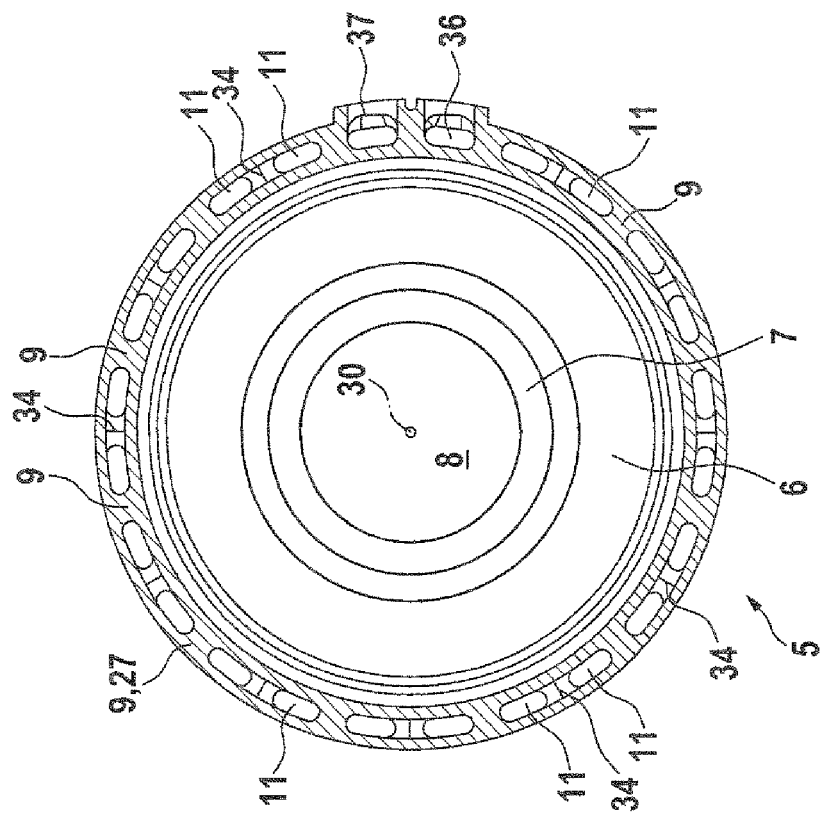
FIG. 3 shows a section A-A according to FIG. 2.

A drive device 1, in the form of a hybrid drive device 2, for a motor vehicle 3 is illustrated in FIG. 1. The hybrid drive device 2 for a motor vehicle 3 comprises an internal combustion engine 4 and also an electrical machine 5 which operates as a motor 32 and a generator 33, in each case for driving or decelerating the motor vehicle 3. The internal combustion engine 4 and the electrical machine 5 are connected to one another by means of a drive shaft 20. The mechanical coupling between the internal combustion engine 4 and the electrical machine 5 can be established and broken by means of a clutch 19. Furthermore, an elasticity means 21 is arranged in the drive shaft 20 which couples the internal combustion engine 4 and the electrical machine 5 to one another. The electrical machine 5 is mechanically coupled to a differential transmission 23. A converter 22 and a transmission 28 are arranged in the drive shaft 20 which connects the electrical machine 5 and the differential transmission 23 to one another. The drive wheels 25 are driven by means of the differential transmission 23 via the wheel axles 24.

Other options (not illustrated) besides the arrangement illustrated in FIG. 1 of the internal combustion engine 4 and the electrical machine 5 for the motor vehicle 3 are also feasible. For example, the electrical machine 5 can be arranged on the side of the internal combustion engine 4 and can be mechanically connected to the internal combustion engine 4 by means of a belt or a chain or by gear wheels (not illustrated) instead of the drive shaft 20 depicted in FIG. 1. In addition, the electrical machine 5 could be arranged on a transmission, for example a differential transmission, or the electrical machine 5 can operate as a wheel hub motor and/or as a wheel hub generator, that is to say it can be arranged in the region of a wheel hub (not illustrated).

Figure 2:
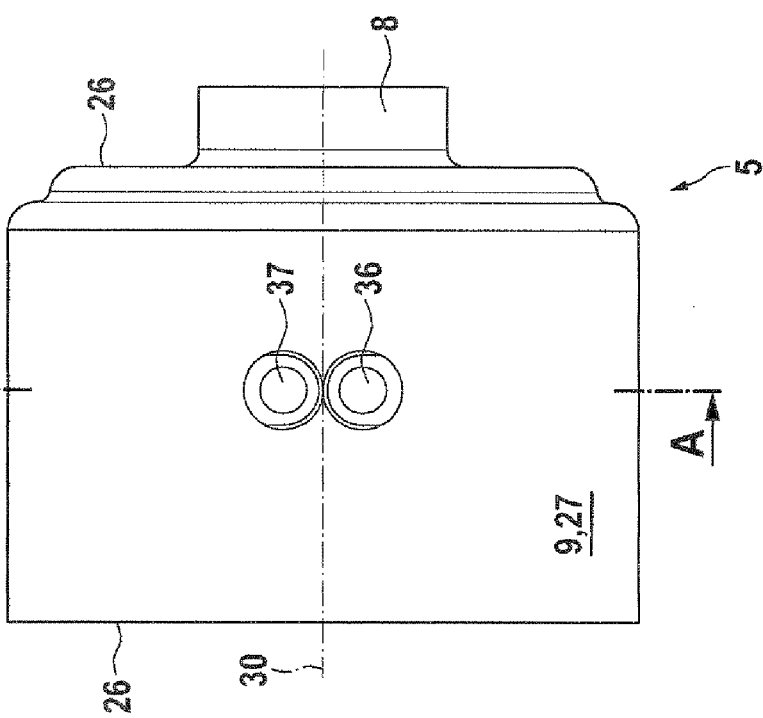
FIG. 2 shows a side view of an electrical machine.
Figure 6:
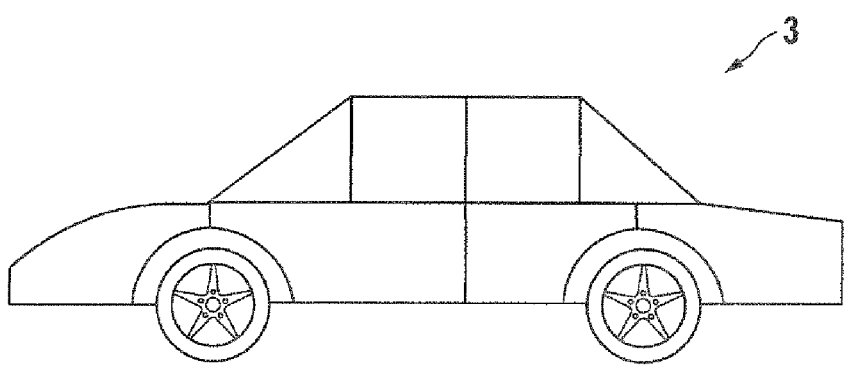
FIG. 6 shows a view of a motor vehicle.

FIGS. 2 and 3 show the electrical machine 5 for the hybrid device 2 in the form of an internal pole machine in a first embodiment with a stationary stator 6 and a rotating rotor 7 of the hybrid drive device 1 in a highly simplified illustration, and therefore electrical lines, the windings of the stator 6 and of the rotor 7, and fixing means for the stator 6, for example, are not illustrated or are illustrated only in a highly simplified manner. A shaft 8 comprises metal, for example steel, on which the rotor 7 is arranged in a concentric manner, with the shaft 8 and the rotor 7 being mounted on the stationary housing 9 by means of a bearing (not illustrated). The shaft 8, the rotor 7 and the stator 6 are arranged within the housing 9. The stator 6 is arranged, concentrically around the rotor 7, on a housing 9, said stator being mounted on said housing by means of fixing means (not illustrated). The stator 6 can also be mounted on the housing 9 without additional fixing means, for example by means of a compression joint and/or shrink-fit joint. The housing 9 is produced, for example, by means of a lost foam casting process, an investment casting process or a permanent mold casting process. The wall thickness of the housing 9 is, for example, in the range of from 2 to 6 mm. In this case, the shaft 8 is connected to the drive shaft 20 of the hybrid drive device 2 within the hybrid drive device 2 and/or constitutes a part of the drive shaft 20.

The electrical machine 5 has a channel 11 for conducting a cooling fluid for cooling the electrical machine 5. The channel 11 is integrated in the housing 9 of the electrical machine 5. An inlet opening 36 for introducing the cooling fluid into the channel 11 and an outlet opening 37 for discharging cooling fluid from the channel 11 are formed in the outer face of the housing 9 of the electrical machine 5 (FIGS. 2 to 5). The inlet opening 36 and the outlet opening 37 are formed in the region of a central plane 29 of the electrical machine 5. The central plane 29 is perpendicular to an axis 30 of the shaft 8. The greatest quantity of heat is given off by the stator 6 and/or the rotor 7 in the region of the central plane 29. On account of the introduction of the cooling fluid into the inlet opening 36 in the region of the central plane 29, the cooling fluid is therefore fed in in that region in which the greatest amount of heat is released within the electrical machine 5, and therefore particularly effective cooling is possible in this critical region of the electrical machine 5. The channel 11 constitutes a part of the cooling circuit 10 (not completely illustrated) of the electrical machine 5 having lines for the cooling fluid and having a heat exchanger or radiator for cooling the cooling fluid.

After the cooling fluid is introduced into the inlet opening 36, the channel 11 splits into an A section 15 and into a B section 16 (FIGS. 4 and 5). The A section 15 and the B section 16 form a first pair 13 of sections 15, 16 of the channel 11. The A section 15 and the B section 16 are both oriented in the axial direction, and therefore the cooling fluid flows in the axial direction of the electrical machine 5 in the A section 15 and in the B section 16. On account of the cooling fluid being split into the A section 15 and the B section 16, the cooling fluid in the A section flows in the opposite direction to in the B section 16. The cooling fluid therefore flows to an axial end face 26 of the electrical machine 5 both in the A section 15 and in the B section 16. The housing 9, as a component 27 of the electrical machine 5, has two axial end faces 26 (FIGS. 4 and 5).

After flowing through the A section 15 of the channel 11, the cooling fluid enters a curve section 31 of the channel 11 and flows further into a C section 17 of the channel 11. Furthermore, the cooling fluid flowing through the B section 16 flows, in an analogous manner, through a further curve section 31 into a D section 17 of the channel 11 (FIGS. 4 and 5). The C section 17 and the D section 18 together form a second pair 14 of sections 17, 18 of the channel 11. The cooling fluid flows in the axial direction of the electrical machine 5 in the C section 17 and in the D section 18. The A section 15, the B section 16, the C section 17 and the D section 18 constitute sections 12 of the channel 11 in which the cooling fluid flows exclusively in the axial direction. Furthermore, the cooling fluid flows in opposing directions in the C section 17 and the D section 18, and therefore the cooling fluid flows from the axial end face 26 to the central plane 29 of the electrical machine 5. The first pair 13 and the second pair 14 are fluidically separated from one another or sealed off from one another by means of a separating crosspiece 34. The two component streams of cooling fluid flowing through the C section 16 and the D section 17 are combined with one another and thoroughly mixed in a connecting section 35 of the channel 11 and flow to a further first pair 13 comprising an A section 15 and a B section 16 of the channel 11. After flowing through the connecting section 35, the cooling fluid is again split into two component streams, into a further first pair 13 comprising the A section 15 and the B section 16. This flow process is repeated until the cooling fluid has flowed from the inlet opening 36, around the entire circumference of the housing 9, to the outlet opening 37. At the outlet opening 37, the cooling fluid is again conducted out of the housing 9 and cooled by means of a heat exchanger (not illustrated) of the cooling circuit 10 and then introduced into the inlet opening 36 again.

The cooling fluid therefore flows through the channel 11 in the housing 9 both in the axial direction and in the radial direction of the electrical machine 5 in a meandering manner. As a result, particularly effective and uniform cooling of the electrical machine 5, in particular of the housing 9, is possible on account of this opposing flow pattern of the cooling fluid in the housing 9. The greatest quantity of heat is produced in the region of the central plane 29 of the electrical machine 5. Here, the heat is absorbed by the cooling fluid and enters the first pair 13 comprising the A section 15 and the B section 16 on the two axial end faces 26 of the electrical machine 5. Significantly less heat is given off by the stator 6 at the two axial end faces 26 than in the region of the central plane 29. As a result, the temperature of the housing 9 in the region of the axial end faces 26 is lower than in the region of the central plane 29. The cooling fluid can therefore give off heat to the housing 9 in the region of the axial end face 26, for example in the region of the curve sections 31 of the channel 11. This enables uniform temperature distribution in the axial direction of the housing 9, and therefore the housing 9 can also give off heat to the surrounding area in a uniform manner. The connecting sections 35 of the channel 11 have a small flow cross-sectional area, and therefore the cooling fluid flows through the connecting sections 35 in a turbulent manner. This advantageously firstly permits particularly effective heat absorption by the cooling fluid in the region of the central plane 29 of the electrical machine 5, and secondly particularly effective through mixing of the component streams from the C section 17 and the D section 18 of the cooling fluid is possible as a result.

Overall, the drive device 1 and the electrical machine 5 according to the invention have significant associated advantages. The cooling fluid is conducted through the channel 11 in the radial and axial direction of the electrical machine 5 in a meandering manner, and therefore the housing 9 can be uniformly cooled.

The invention claimed is:
1. An electrical machine (5), comprising:
a housing (9),
a shaft (8) having an axis (30),
a stator (6) and a rotor (7), and
at least one channel (11) for conducting a cooling fluid for cooling the electrical machine (5), characterized in that the at least one channel (11) includes an inlet opening (36) and an outlet opening (37), both of which are arranged in the region of a central plane (29) of one of the electrical machine (5) and a component (27) of the electrical machine (5), said central plane (29) being perpendicular to the axis (30), and further characterized in that the at least one channel (11) defines a meandering path that includes:
- a first pair of sections (15, 16) which diverge from the inlet opening (36) and extend in opposite axial directions to direct a pair of separate component streams of cooling fluid away from the central plane (29),
- a second pair of sections (17, 18) extending from the first pair of sections (15, 16) and converging in opposite axial directions to a connecting section (35) arranged in the region of the central plane (29), in order to mix the pair of separate component streams of cooling fluid together, and
- a third pair of sections (15, 16) extending from the second pair of sections (17, 18) and diverging from the connecting section (35) to extend in opposite axial directions to direct a pair of separate component streams of cooling fluid away from the central plane (29).

2. The electrical machine as claimed in claim 1, characterized in that the first pair of sections (15, 16) are arranged to direct the cooling fluid to a pair of opposite axial end faces (26) of the electrical machine (5).

3. The electrical machine as claimed in claim 1, characterized in that the meandering path further includes two curve sections (31), each one of which turns the cooling fluid from one of the first pair of sections (15, 16) to one of the second pair of sections (17, 18).

4. The electrical machine as claimed in claim 3, further comprising a separating crosspiece (34) arranged between the first pair of sections (15, 16) and the second pair of sections (17, 18), and at least partially defining the two curve sections (31).

5. A drive device (1), comprising:
- an internal combustion engine (4), and
- at least one electrical machine (5) as claimed in claim 1.

6. The electrical machine as claimed in claim 1, characterized in that the at least one channel (11) is formed in the housing (9).

7. The electrical machine as claimed in claim 1, characterized in that the at least one channel (11) is formed in the stator (6).

8. The electrical machine as claimed in claim 1, characterized in that the cooling fluid is a liquid.

9. The electrical machine as claimed in claim 1, characterized in that the cooling fluid is an oil.

10. The electrical machine as claimed in claim 1, characterized in that the cooling fluid is a water/glycol mixture.

11. The electrical machine as claimed in claim 1, characterized in that the meandering path further includes additional alternating pairs of converging and diverging sections extending about a circumference of the electrical machine, the meandering path terminating in a pair of sections converging to the outlet opening (37).

* * * * *